United States Patent [19]
Baker et al.

[11] Patent Number: 5,308,169
[45] Date of Patent: May 3, 1994

[54] BEARING SYSTEM FOR TURBOCHARGER

[75] Inventors: Glenn L. Baker, Columbus; David R. Engle, Paris Crossing; Roger Williams, North Vernon, all of Ind.

[73] Assignee: Cummins Engine Company, Inc., Columbus, Ind.

[21] Appl. No.: 984,186

[22] Filed: Nov. 20, 1992

[51] Int. Cl.⁵ .................... F16C 17/04; F04B 17/00
[52] U.S. Cl. ........................... 384/99; 384/121; 384/368; 417/407
[58] Field of Search ............... 384/99, 121, 123, 287, 384/368, 420; 417/407

[56] References Cited

U.S. PATENT DOCUMENTS

| | | | |
|---|---|---|---|
| 3,077,296 | 2/1963 | Ping, Jr. | 384/368 X |
| 4,268,229 | 5/1981 | Berg | 417/407 |
| 4,285,632 | 8/1981 | DeSalve | 415/175 |
| 4,376,617 | 3/1983 | Okano et al. | 417/407 |
| 4,453,837 | 6/1984 | Shimizu et al. | 384/121 |
| 4,541,285 | 9/1985 | Häfner | 73/744 |
| 4,639,148 | 1/1987 | Tamura et al. | 384/368 X |
| 4,708,602 | 11/1987 | McEachern, Jr. et al. | 417/407 |
| 4,808,091 | 2/1989 | Ruetz | 417/407 |
| 4,902,144 | 2/1990 | Thoren | 384/99 X |
| 4,943,170 | 7/1990 | Aida | 384/99 |
| 5,014,820 | 5/1991 | Evans | 184/6.3 |

Primary Examiner—Thomas R. Hannon
Attorney, Agent, or Firm—Woodard, Emhardt, Naughton, Moriarty & McNett

[57] ABSTRACT

A thrust bearing for a turbocharger includes a main body portion which defines a central bore for receipt of a thrust collar, an oil reservoir in the shape of a blind, oblong slot disposed in the main body portion and an oil passageway connecting the oil reservoir with the central bore. As oil is drained from the turbocharger by a siphoning action as the engine oil level drops, oil which is stored in the oil reservoir will remain and after the engine has completely stopped this stored oil is available to drain into the interface between the thrust collar and central bore of the thrust bearing in order to provide lubricating oil to this interface upon restart of the engine. Oil is also provided by the reservoir to the turbine and compressor journal bearings where it is held in small clearances on the inner and outer surfaces of the journal bearings.

15 Claims, 4 Drawing Sheets

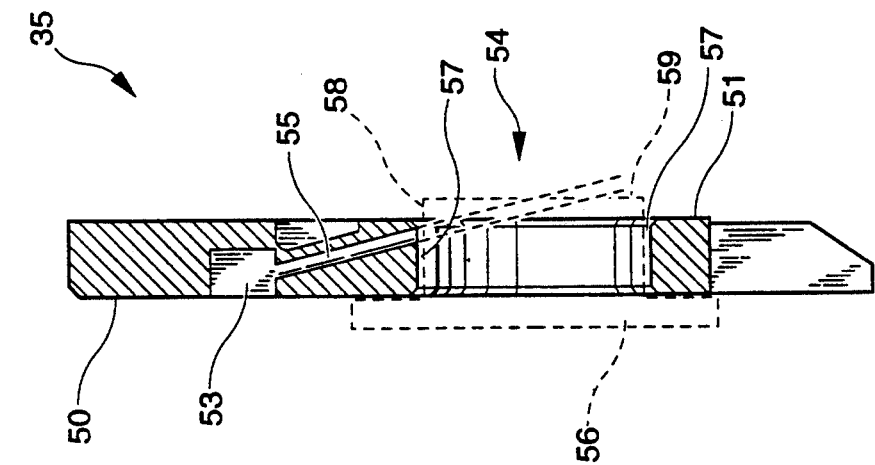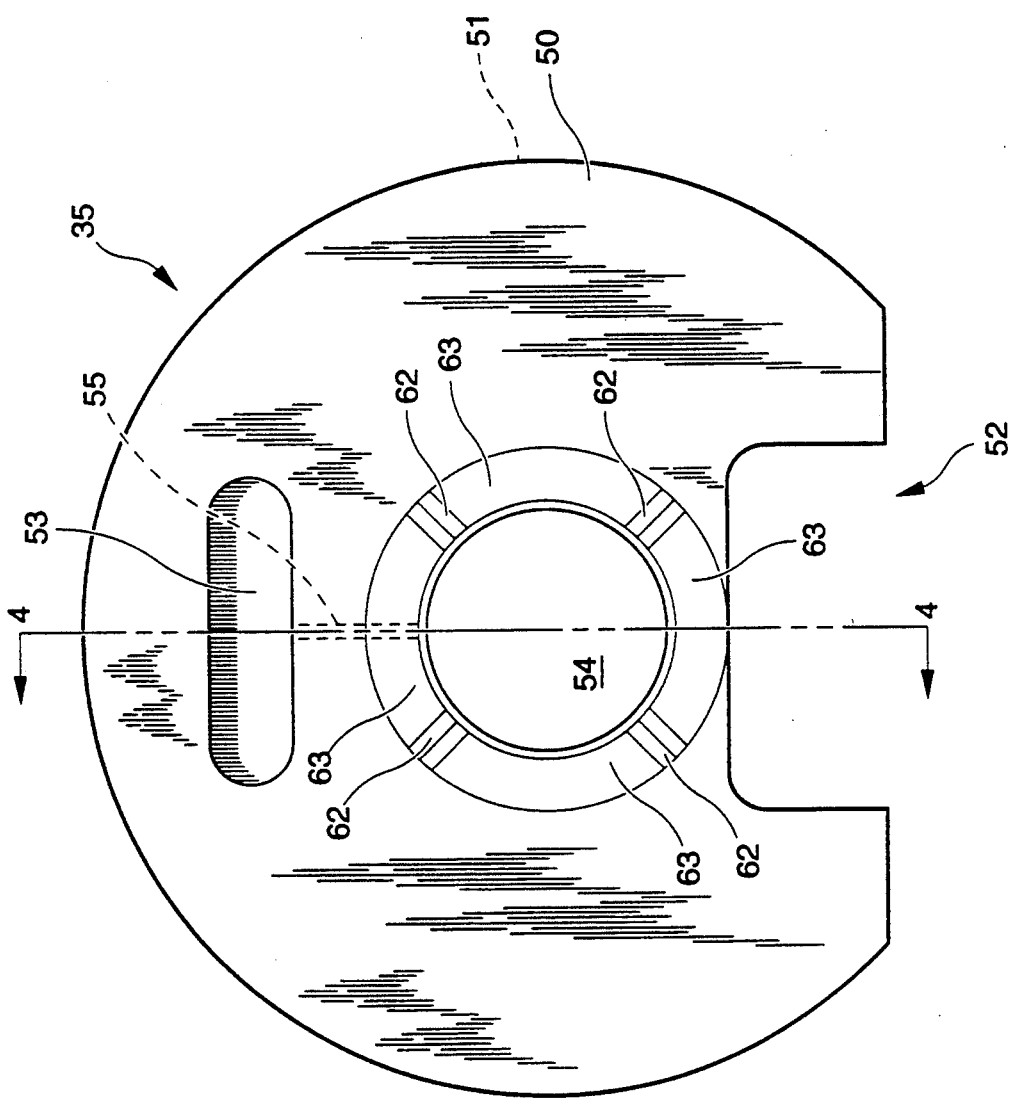

BEARING SYSTEM FOR TURBOCHARGER

BACKGROUND OF THE INVENTION

The present invention relates in general to turbocharger designs and lubrication of the turbocharger thrust and journal bearings. More specifically the present invention relates to a modification of the thrust bearing to incorporate an oil reservoir in order to provide initial lubrication during engine start up, especially cold weather starting.

Turbocharger bearings are subject to excessive wear during initial engine start up. This is due to the lack of lubricating fluid at the point of contact between the stationary and rotating components of the bearing system prior to full lubrication pressure being built up in the engine after start up. An aggravating factor for the turbocharger bearing system is the fact that the oil is typically siphoned away from the turbocharger as soon as the engine is shut down. Since the turbocharger may continue to coast down in speed for a period of time approaching approximately 30 seconds, the bearings are left in an extremely dry condition for the next engine start up.

Available data, reports and failure analysis indicate that thrust or journal bearing failures may comprise as much as 50% of turbocharger warranty failures. Much of this damage is due to the delay in oil delivery to the turbocharger after high speed engine starts at cold ambient conditions.

In recent years increasingly stringent engine design requirements have meant higher and higher rotary speeds for the typical diesel engine turbocharger. Even at engine idle conditions, these high rotor speeds combine with increased aerodynamic thrust loads to create much higher rates of wear in the bearing system during the few seconds after an engine start before the turbocharger receives lubricating oil. The combination of smaller turbine casings, higher rotary speeds and higher aerodynamic loads at idle has aggravated this failure mode.

In a typical turbocharger installation, the turbocharger is mounted at a relatively high position on the engine so that it can receive exhaust gases directly from the exhaust manifold and supply compressed air directly to the intake manifold or aftercooler. The oil supply however, typically arrives at the turbocharger bearing housing from a location farther down in the engine block where pressurized oil is present. Due to these relative points of attachment, a siphoning action occurs immediately after the engine is stopped and this siphoning action drains oil from the turbocharger oil supply line back into the engine.

While the engine is running, the oil pump supplies oil to all components of the engine and all oil passages are filled with oil. Immediately following engine shutdown therefore, oil is present at some high level within the engine. As the oil drains down within the engine it soon drops below the level of the turbocharger oil supply rifle. At this point a suction is created by the difference in oil head between the level in the turbocharger and the continually falling oil level in the engine. Air is drawn into the turbocharger oil line at the journal bearings and thrust bearing lubrication points. Air continues to flow into the oil supply system of the turbocharger until the siphon is broken by the accumulated air trapped in the oil supply line. This has been measured to be a period of time similar to that required for the turbocharger to coast to a stop following engine shutdown. Because of the siphoning action virtually no oil is allowed into the thrust system after engine shutdown, even though the turbocharger continues to spin for approximately 30 seconds afterwards Because of the continued spinning of the turbocharger without additional oil flow to replenish the bearing system, most of the oil present in the bearing system is pumped out, leaving the bearings exposed to damage during the next engine start up.

The present invention solves this thrust bearing lubrication problem by creating an oil reservoir in the thrust bearing which drains oil into the journal bearings and thrust bearing. Oil is retained by capillary action within the bearings and is available for the next engine startup, even if the engine is not started for several days.

SUMMARY OF THE INVENTION

A turbocharger thrust bearing for use in combination with a turbocharger according to one embodiment of the present invention comprises a main body portion defining a central bore, oil reservoir means for storing oil to be delivered to the central bore, the oil reservoir means disposed in and defined by the main body portion, and an oil passageway defined by the main body portion and connecting the oil reservoir means with the central bore.

One object of the present invention is to provide improved durability to the turbocharger thrust and journal bearings.

Related objects and advantages of the present invention will be apparent from the following description.

BRIEF DESCRIPTION OF THE DRAWINGS

FIG. 3 is a front elevational view of an improved thrust bearing according to a typical embodiment of the present invention.

FIG. 4 is a side elevational view in full section of the FIG. 3 thrust bearing as viewed along line 4—4.

DESCRIPTION OF THE PREFERRED EMBODIMENT

Figure 1:
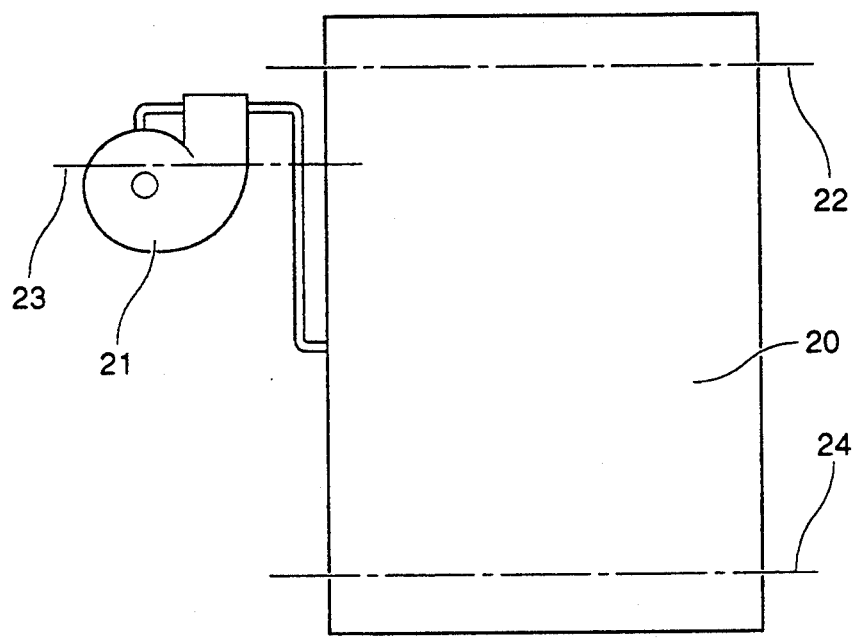
FIG. 1 is a schematic illustration of the relative vertical positions of a turbocharger and its associated engine.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated in schematic form the approximate vertical positional relationship between vehicle engine 20 and turbocharger 21. As is well-known in the art, when the engine is started pressurized oil starts filling those portions of the engine where oil is required for lubrication and cooling. While the engine is running the oil pump supplies oil to all components of the engine and all oil passages are filled with oil. This oil level is diagrammatically illustrated by oil level line 22. Oil level line 22 is vertically above the position of the turbocharger 21 and is at this level immediately following engine shutdown.

As the engine remains in a shutdown mode, the oil level begins to fall and is soon below the level of the turbocharger oil supply rifle (see FIG. 2). The turbocharger oil supply rifle level is denoted by horizontal line 23. As the engine oil level falls below the level of line 23, a suction is created by the difference in oil head pressure between the oil supply rifle (line 23) and the continually falling oil in the engine. In turn a siphoning action is created which drains oil from the turbocharger as the oil level in the engine falls. As the volume of oil in the turbocharger is depleted, air is drawn into the turbocharger line, typically at the journal bearing and thrust bearing lubrication points.

Air continues to flow into the oil supply system of the turbocharger until the siphon is broken by the accumulated air trapped in the oil supply line. This siphoning action has been measured to be a period of time similar to that required for the turbocharger to coast to a stop following engine shutdown. Oil level line 24 represents the oil level of the engine a few minutes after engine shutdown and while the engine is at rest.

Figure 2:
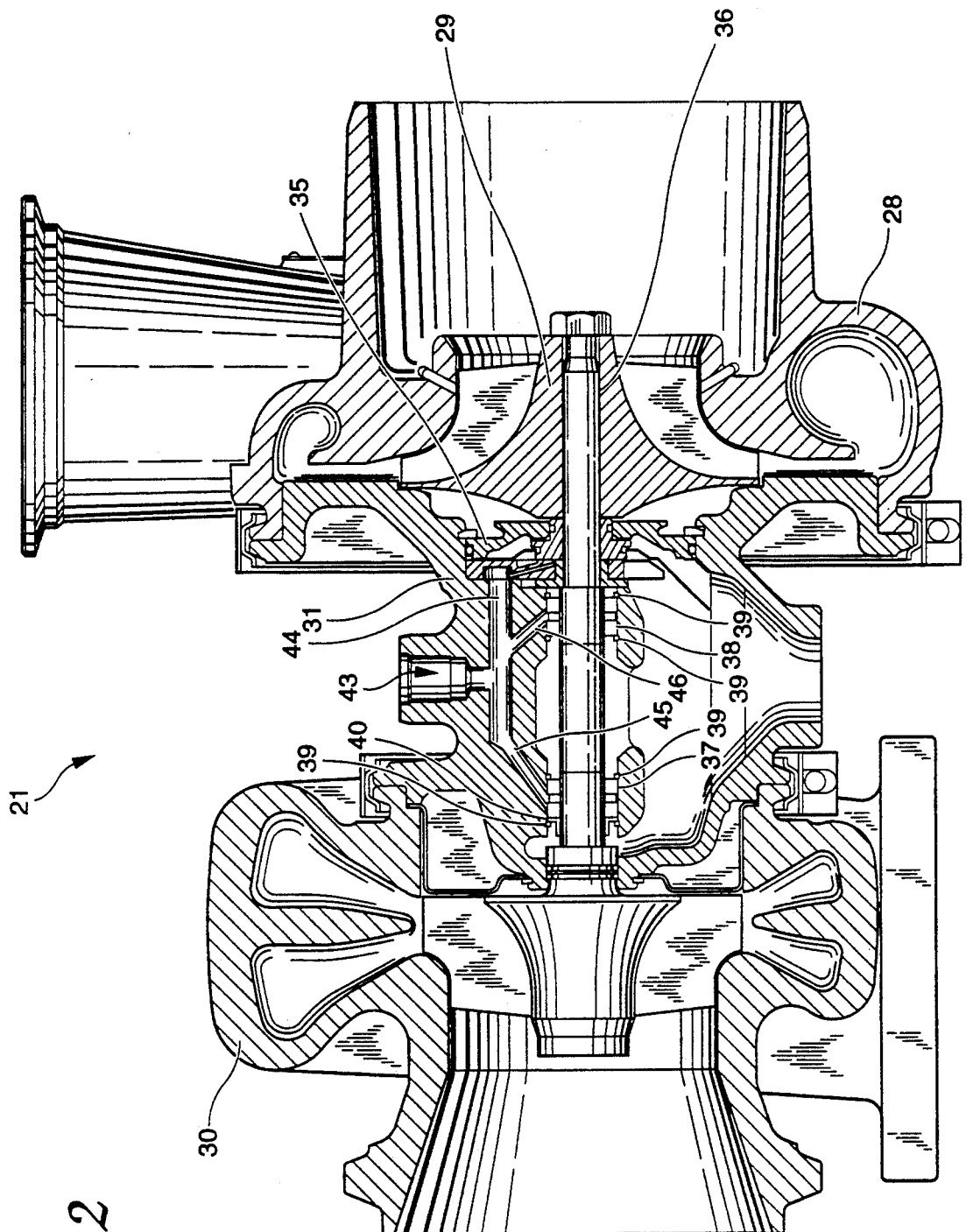
FIG. 2 is a side elevational view in full section of a turbocharger which has been schematically illustrated in FIG. 1.

Referring to FIG. 2, turbocharger 21 is illustrated in detail as a side elevational view in full section. Turbocharger 21, includes a compressor housing 28, impeller 29, turbine housing 30 and bearing housing 31. The illustrated turbocharger construction is generally conventional as to the main components. Disposed within the bearing housing 31 is the thrust bearing 35 which is the focus of the present invention.

Shaft 36 which extends from the compressor housing into the turbine housing, through the center of the bearing housing, is supported by turbocharger bearings (sleeve bearings) 37, 38. Retaining rings 39 are used to axially fix the position of the turbocharger bearings and sleeve 40 serves as an oil control sleeve.

The bearing housing is machined with an oil inlet 43, main oil rifle 44 and passageways 45 and 46. Passageway 45 is directed at the turbine bearing 37 and passageway 46 is directed at the compressor journal bearing 38. The main oil rifle 44 is directed at thrust bearing 35. Oil delivered to the main bearing inlet 43 is routed to each of the three bearings and continuously lubricates the bearings during operation of the engine and turbocharger.

Referring to FIGS. 3 and 4, the thrust bearing 35 according to the present invention is illustrated. Thrust bearing 35 is a relatively thin, generally cylindrical member having substantially flat opposite faces 50 and 51, a relief notch 52 at its lower edge and is machined with an oil reservoir 53. Oil reservoir 53 is in effect an oblong, blind slot which is defined by the main body portion of the thrust bearing and which does not extend completely through the thrust bearing. Oil reservoir 53 communicates with center bore 54 by way of drilled passageway 55. Passageway 55 is centered within the oblong oil reservoir 53 and is oriented so as to effectively be on a radial line from the axial center of central bore 54.

Illustrated in broken line form is thrust collar 56 which receives shaft 36. Annular clearance space 57 is disposed between the inside diameter edge of central bore 54 and the outside diameter surface 58 of hub 59 of collar 56.

The front face 50 of thrust bearing 35 includes four, radially extending, equally spaced channels 62 for the flow of oil to and from the interface between the thrust collar 56 (both the flange and the hub) and the thrust bearing 35. The four channels 62 are machined with a V-groove shape with a maximum depth into the main body of the thrust bearing of only a few thousandths of an inch.

The oil reservoir 53 is also machined (milled) into the front face 50 of the thrust bearing 35. Oil reservoir is oblong and measures approximately 22 mm in length by 6.3 mm in width and 3.6 mm in depth. As mentioned, the oil reservoir is in effect a blind slot since it does not extend completely through the thickness of the thrust bearing. Passageway 55 is drilled from the base of reservoir 53 into central bore 54. The illustrated angularity of passageway 55 is the result of the drill bit needing to clear the edge of the central bore 54, as shown by the broken line extension of passageway 55.

When the engine is running and the oil fills the oil passageways, the bearing housing 31 of turbocharger 21 is likewise filled with oil. The oil inlet delivers oil to the turbine 37 and compressor 38 journal bearings as well as to the thrust bearing 35 via the main oil rifle 44. As illustrated in FIG. 2, the main oil rifle abuts against the front face 50 and is aligned such that the rifle opening spans the lower edge of the oil reservoir 53. Consequently, oil is delivered to the reservoir and thus to the thrust collar and thrust bearing interface by way of clearance space 57. Oil can then travel from the clearance space 57 outwardly to lubricate the thrust pads 63 by way of four, V-grooved channels 62.

When the engine is shut down the oil level in the engine begins dropping from oil level 22 to oil level 24 (see FIG. 1). As the oil level in the engine drops below the turbocharger level, a suction is created by the difference in the oil head between oil level line 23 and the continually falling oil level in the engine. As a result the oil in the turbocharger begins to drain by means of the siphoning action, as previously described. The siphoning action drains oil from the turbocharger and continues until air is drawn into the siphon path and accumulates to a sufficient volume in order to break the siphoning action. Air is drawn into the oil draining path at the locations of the turbine bearing 37, compressor bearing 38 and thrust bearing 35 (see FIG. 2).

Figure 5:
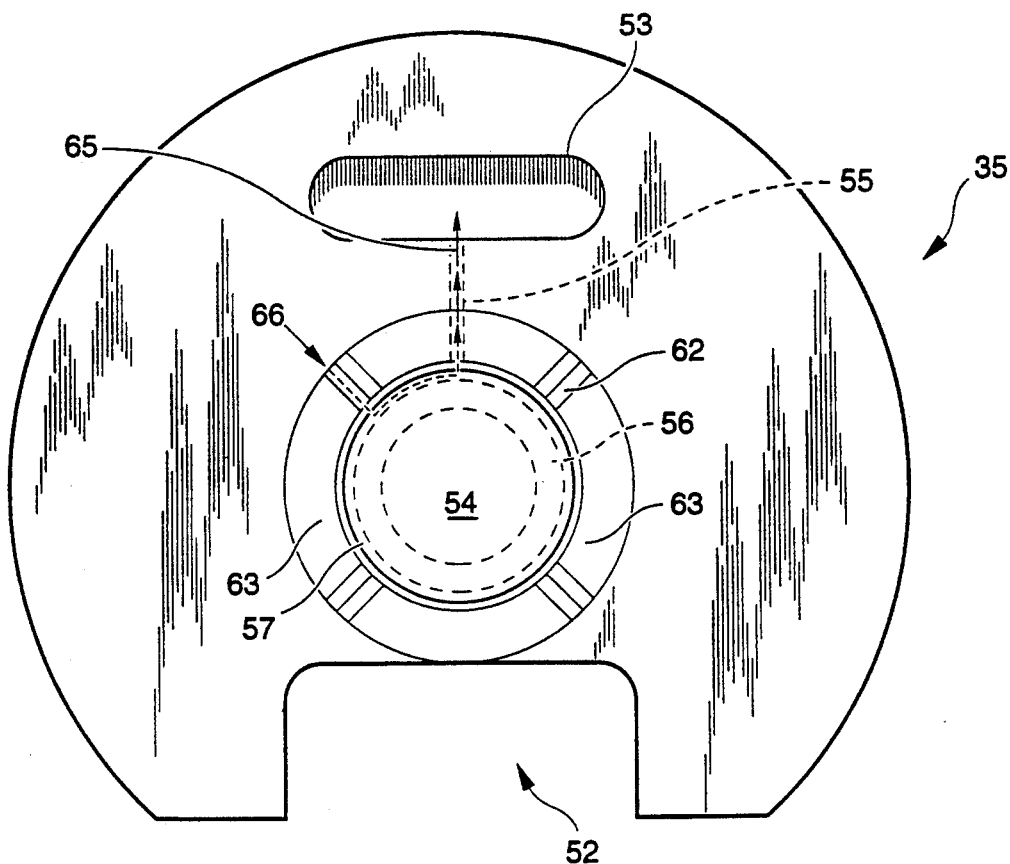
FIG. 5 is a front elevational view of the FIG. 3 thrust bearing detailing an air and oil flow path.

Referring to FIG. 5, the oil exit path from the interface spaces between the thrust collar 56 and thrust bearing 35 is illustrated by arrow path 65. The path extends up through passageway 55, through the center of the oil reservoir 53 and out through the main oil rifle 44. The position of the oil reservoir 53 relative to the oil draining path, which begins below the oil reservoir, leaves a volume of oil in the oil reservoir 53.

Air will begin to flow into the oil supply system (flow path) of the turbocharger as the oil is exhausted through the path 66. The siphoning action continues until it is broken by the accumulation of air which is trapped in the oil supply line. The time for this condition (siphoning action stops) to be reached is similar to the time required for the turbocharger to coast to a stop following engine shutdown. The oil stored in the oil reservoir is not lost during the siphoning action because of the continuous flow of air through passageway 55. When the siphoning action stops, generally concurrently with the rotor becoming nearly or fully stationary, the oil from the reservoir is delivered or drains via passageway 55 into clearance space 57 between the central bore 54 and the thrust collar 56. The oil delivered to the clearance space, which is in effect a bearing annular volume, does not drain out. This oil is then available for the next engine startup, even if the engine is not restarted for several days. Oil is also provided by the reservoir to the turbine and compressor journal bearings where it is held in small clearances on the inner and outer surfaces of the journal bearings.

Figure 6:
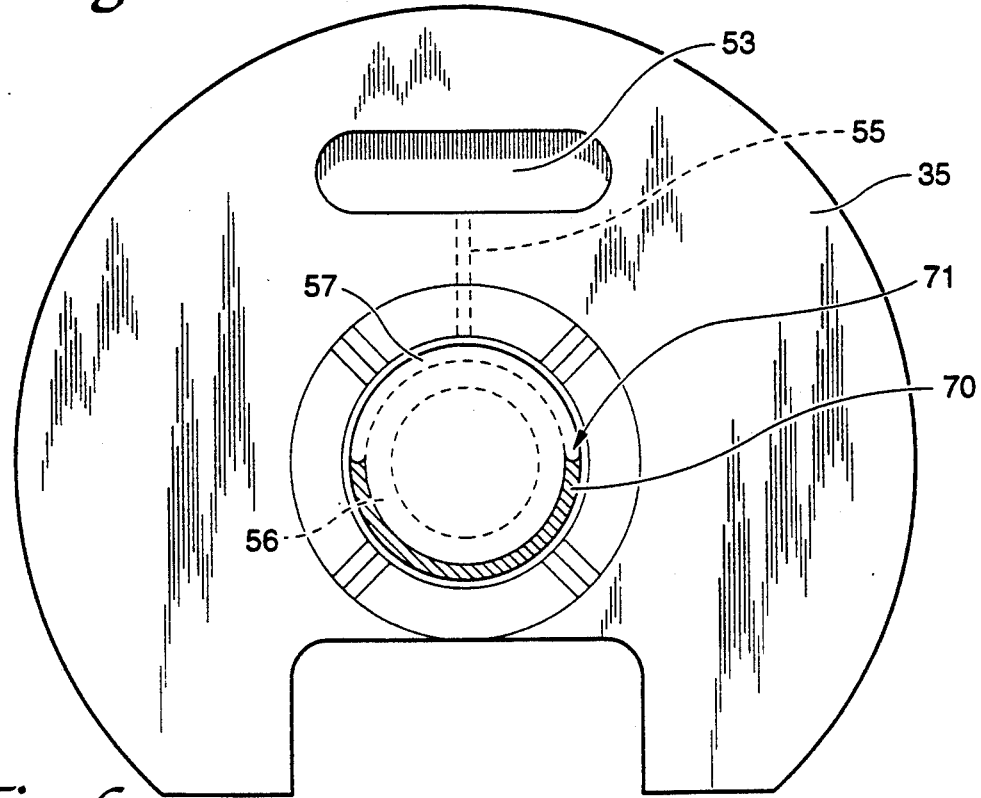
FIG. 6 is a front elevational view of the FIG. 3 thrust bearing in combination with a thrust collar and illustrating a volume of oil disposed therebetween.

Referring to FIG. 6 the trapped and retained oil which is delivered to the clearance space 57 (bearing annular volume) is illustrated. As is shown, the volume of oil 70 assumes a generally semi-cylindrical shape with a length or depth approximately equal to the thickness of the thrust bearing 35. The top of oil volume 70 includes a generally concave meniscus 71 which has the concave shape both side to side as illustrated in FIG. 6 as well as front to rear which direction would correspond to front face 50 to rear face 51. The surface tension creating meniscus 71 pulls up on the volume of oil and holds the volume of oil 70 in position in the annular volume against the action of gravity. It has been found that engine oil and even much lower viscosity diesel fuel will remain in this semi-cylindrical configuration with the corresponding meniscus for long periods of time without draining away even when subjected to vigorous vibration.

Therefore, when the engine is restarted this volume of oil 70 is immediately available for the rotating/stationary interface between the thrust collar and the thrust bearing. This provides the much needed initial lubrication and provides a sufficient volume for lubrication to be maintained until such time as the oil from the engine can be delivered to the main oil rifle and thus to the bearings of the turbocharger.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:
   a turbocharger thrust bearing including:
   a main body portion defining a cylindrical bore;
   oil reservoir means for storing oil to be delivered to said cylindrical bore, said oil reservoir means disposed in and defined by said body portion; and
   an oil passageway defined by said main body portion and connecting said oil reservoir means with said cylindrical bore;
   a turbocharger thrust collar having a generally cylindrical hub and a surrounding flange, said hub being received within said cylindrical bore; and
   a semi-cylindrical volume of oil disposed between the outside diameter of said cylindrical hub and the inside diameter of said cylindrical bore.

2. The combination of claim 1 wherein said oil reservoir means includes a blind, oblong slot.

3. The combination of claim 2 wherein said connecting oil passageway is centered in said oblong slot and disposed on a line radially extending from said cylindrical bore.

4. The combination of claim 1 wherein said semi-cylindrical volume of oil includes a concave meniscus top surface.

5. A thrust baring, for the rotor shaft of a turbocharger, which is arranged with a relatively thin, main body defining a central bore, said thrust bearing comprising:
   a substantially flat first face extending around said central bore;
   a substantially flat second face oppositely disposed relative to said first face and extending around said central bore;
   an oil reservoir created down into said main body from said first face and extending only part way toward said second face and being spaced apart from said central bore;
   an oil passageway defined by said main body and connecting in oil flow communication said oil reservoir with said central bore; and
   a plurality of oil flow channels disposed down in said first face and extending outwardly from the central bore for routing oil from the area of the central bore to portions of said first face.

6. The thrust bearing of claim 5 wherein said oil reservoir is shaped as an oblong, blind slot.

7. The thrust bearing of claim 6 wherein said oil passageway is centered in said blind slot and is oriented along a radially extending plane from said central bore.

8. The thrust bearing of claim 7 wherein said plurality of oil flow channels includes four flow channels each of which has a V-shaped lateral cross section.

9. In combination:
   a turbocharger thrust bearing including:
   a main body portion defining a cylindrical bore;
   an oil reservoir for storing oil to be delivered to said cylindrical bore, said oil reservoir being disposed in and defined by said main body portion; and
   an oil passageway defined by said main body portion and connecting said oil reservoir with said cylindrical bore; and
   a turbocharger thrust collar having a generally cylindrical hub and a surrounding flange, said hub being received within said cylindrical bore and defining therewith a clearance space for oil storage;

10. The thrust bearing of claim 9 wherein said oil reservoir is shaped as an oblong, blind slot.

11. The thrust bearing of claim 10 wherein said oil passageway is centered in said blind slot and is oriented along a radially extending plane from said central bore.

12. In combination:
   a turbocharger having a compressor portion, a turbine portion and a bearing housing including a main oil rifle;
   a main body portion defining a central bore;
   an oil reservoir for storing oil to be delivered to said central bore, said oil reservoir being disposed in and defined by said main body portion; and
   an oil passageway defined by said main body portion and connecting said oil reservoir with said central bore;
   a turbocharger thrust collar having a generally cylindrical hub and a surrounding flange, said hub being received within said cylindrical bore; and
   a semi-cylindrical volume of oil disposed between the outside diameter of said cylindrical hub and the inside diameter of said cylindrical bore.

13. The thrust bearing of claim 12 wherein said oil reservoir is shaped as an oblong, blond slot.

14. The thrust bearing of claim 13 wherein said oil passageway is centered in said blind slot and is oriented along a radially extending plane from said central bore.

15. In combination:
- a turbocharger having a compressor portion, a turbine portion and a bearing housing including a main oil rifle;
- a turbocharger thrust bearing disposed in said turbocharger and including:
  - a main body portion defining a central bore;
  - oil reservoir means for storing oil to be delivered to said central bore, said oil reservoir means disposed in and defined by said main body portion; and
  - an oil passageway defined by said main body portion and connecting said oil reservoir means with said central bore;

and
- a turbocharger thrust collar having a generally cylindrical hub and a surrounding flange, said hub being received within said cylindrical bore and defining therewith a clearance space for oil storage.

* * * * *

UNITED STATES PATENT AND TRADEMARK OFFICE
CERTIFICATE OF CORRECTION

PATENT NO. : 5,308,169
DATED     : May 3, 1994
INVENTOR(S) : Glenn L. Baker, et al.

It is certified that error appears in the above-indentified patent and that said Letters Patent is hereby corrected as shown below:

In Column 6, at line 4, please delete "baring" and substitute --bearing--.

In Column 7, at line 2, please delete "blond" and substitute --blind--.

Signed and Sealed this

Twenty-third Day of August, 1994

Attest:

BRUCE LEHMAN

*Attesting Officer*   *Commissioner of Patents and Trademarks*